(12) United States Patent
Chandrashekaran et al.

(10) Patent No.: US 10,305,780 B1
(45) Date of Patent: May 28, 2019

(54) CONTROLLING ACCUMULATED INTERIOR GATEWAY PROTOCOL ("AIGP") ATTRIBUTE UPDATES

(71) Applicant: Juniper Networks, Inc., Sunnyvale, CA (US)

(72) Inventors: Natarajan Chandrashekaran, Chennai (IN); Gurpreet Singh Dhaliwal, Indore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/828,418

(22) Filed: Nov. 30, 2017

(51) Int. Cl.
*H04L 12/715* (2013.01)
*H04L 12/733* (2013.01)
*H04L 12/755* (2013.01)
*H04L 12/947* (2013.01)
*H04L 12/751* (2013.01)
*H04L 12/66* (2006.01)

(52) U.S. Cl.
CPC ............ *H04L 45/04* (2013.01); *H04L 45/122* (2013.01); *H04L 12/66* (2013.01); *H04L 45/021* (2013.01); *H04L 45/026* (2013.01); *H04L 49/25* (2013.01)

(58) Field of Classification Search
None
See application file for complete search history.

(56) References Cited

U.S. PATENT DOCUMENTS

2004/0221296 A1* 11/2004 Ogielski ................. H04L 41/00
719/313
2016/0119229 A1* 4/2016 Zhou .................... H04L 12/4633
370/392

* cited by examiner

*Primary Examiner* — Shukri Taha
(74) *Attorney, Agent, or Firm* — John C. Pokotylo; Pokotylo Patent Services (57) ABSTRACT

The problem of excessive BGP updates to update the AIGP cost is systems with excessively changing IGP metrics is solved by (1) monitoring AIGP value changes over a given time period, (2) determining whether or not the AIGP value changes over the given period of time are excessive (e.g., are greater than a predetermined threshold), (3) responsive to a determination that the AIGP changes over the given period of time are not excessive, use the actual AIGP value in the AIGP protocol, but otherwise, responsive to a determination that the AIGP changes over the given period of time are excessive, (i) setting (e.g., locking) the AIGP value to a predetermined or derived value (and using the set or locked AIGP value in advertisements) for a second period of time (regardless of whether or not the actual AIGP value changes during the second period of time), and (ii) using the set (e.g., locked) AIGP value in the AIGP protocol.

20 Claims, 9 Drawing Sheets

CONTROLLING ACCUMULATED INTERIOR GATEWAY PROTOCOL ("AIGP") ATTRIBUTE UPDATES

§ 1. BACKGROUND OF THE INVENTION

§ 1.1 Field of the Invention

Example embodiments consistent with the present invention concern network communications. In particular, at least some such example embodiments concern improving an accumulated interior gateway protocol ("AIGP"), such as that described in request for comment ("RFC") 7311 (incorporated herein by reference) of the Internet Engineering Task Force ("IETF").

§ 1.2 Background Information

In network communications system, protocols are used by devices, such as routers for example, to exchange network information. Routers generally calculate routes used to forward data packets towards a destination. Some protocols, such as the Border Gateway Protocol ("BGP"), which is summarized in § 1.2.1 below, allow routers in different autonomous systems ("ASes") to exchange reachability information.

§ 1.2.1 the Border Gateway Protocol ("BGP")

The Border Gateway Protocol ("BGP") is an inter-Autonomous System routing protocol. The following refers to the version of BGP described in RFC 4271 (incorporated herein by reference). The primary function of a BGP speaking system is to exchange network reachability information with other BGP systems. This network reachability information includes information on the list of Autonomous Systems (ASes) that reachability information traverses. This information is sufficient for constructing a graph of AS connectivity, from which routing loops may be pruned, and, at the AS level, some policy decisions may be enforced.

It is normally assumed that a BGP speaker advertises to its peers only those routes that it uses itself (in this context, a BGP speaker is said to "use" a BGP route if it is the most preferred BGP route and is used in forwarding).

Generally, routing information exchanged via BGP supports only the destination-based forwarding paradigm, which assumes that a router forwards a packet based solely on the destination address carried in the IP header of the packet. This, in turn, reflects the set of policy decisions that can (and cannot) be enforced using BGP.

BGP uses the transmission control protocol ("TCP") as its transport protocol. This eliminates the need to implement explicit update fragmentation, retransmission, acknowledgement, and sequencing. When a TCP connection is formed between two systems, they exchange messages to open and confirm the connection parameters. The initial data flow is the portion of the BGP routing table that is allowed by the export policy, called the "Adj-Ribs-Out."

Incremental updates are sent as the routing tables change. BGP does not require a periodic refresh of the routing table. To allow local policy changes to have the correct effect without resetting any BGP connections, a BGP speaker should either (a) retain the current version of the routes advertised to it by all of its peers for the duration of the connection, or (b) make use of the Route Refresh extension.

KEEPALIVE messages may be sent periodically to ensure that the connection is live. NOTIFICATION messages are sent in response to errors or special conditions. If a connection encounters an error condition, a NOTIFICATION message is sent and the connection is closed.

A BGP peer in a different AS is referred to as an external peer, while a BGP peer in the same AS is referred to as an internal peer. Internal BGP and external BGP are commonly abbreviated as IBGP and EBGP, respectively.

If a particular AS has multiple BGP speakers and is providing transit service for other ASes, then care must be taken to ensure a consistent view of routing within the AS. A consistent view of the interior routes of the AS is provided by the IGP used within the AS. In some cases, it is assumed that a consistent view of the routes exterior to the AS is provided by having all BGP speakers within the AS maintain IBGP with each other.

§ 1.2.2 the Accumulated IGP ("AIGP") Metric Attribute for BGP

Many routing protocols have been designed to run within a single administrative domain. These are known collectively as "Interior Gateway Protocols" ("IGPs"). Typically, each link within an AS is assigned a particular "metric" value. The path between two nodes can then be assigned a "distance" or "cost", which is the sum of the metrics of all the links that belong to that path. An IGP typically selects the "shortest" (minimal distance, or lowest cost) path between any two nodes, perhaps subject to the constraint that if the IGP provides multiple "areas", it may prefer the shortest path within an area to a path that traverses more than one area. Typically, the administration of the network has some routing policy that can be approximated by selecting shortest paths in this way.

BGP, as distinguished from the IGPs, was designed to run over an arbitrarily large number of administrative domains ("autonomous systems" or "ASes") with limited coordination among the various administrations. BGP normally does not make its path-selection decisions based on a metric; generally, there is no such thing as an "inter-AS metric". There are two fundamental reasons for this.

First, the distance between two nodes in a common administrative domain may change at any time due to events occurring in that domain. These changes are not propagated around the Internet unless they actually cause the border routers of the domain to select routes with different BGP attributes for some set of address prefixes. This accords with a fundamental principle of scaling; namely, that changes with only local significance must not have global effects. If local changes in distance were always propagated around the Internet, this principle would be violated.

Second, a basic principle of inter-domain routing is that the different administrative domains may have their own policies, which do not have to be revealed to other domains and which certainly do not have to be agreed to by other domains. Yet, the use of an inter-AS metric in the Internet would have exactly these effects.

There are, however, deployments in which a single administrative entity (also referred to as a "single administration") runs a network that has been sub-divided into multiple, contiguous ASes, each running BGP. There are several reasons why a single administrative domain may be broken into several ASes (which, in this case, are not really autonomous.) For example, it may be that the existing IGPs do not scale well in the particular environment. Or it may be that a more generalized topology is desired than could be obtained by use of a single IGP domain. Or, it may be that a more finely grained routing policy is desired than can be supported by an IGP. In such deployments, it can be useful to allow BGP to make its routing decisions based on the IGP metric, so that BGP chooses the shortest path between two nodes, even if the nodes are in two different ASes within that same administrative domain.

RFC 7311 defines a new optional, non-transitive BGP attribute, called the "Accumulated IGP Metric Attribute", or "AIGP attribute", and specifies procedures for using it. The procedures specified in RFC 7311 prevent the AIGP attribute from "leaking out" past an administrative domain boundary into the Internet.

The set of ASes in a common administrative domain are referred to as an "AIGP administrative domain".

The procedures specified in RFC 7311 also ensure that the value in the AIGP attribute has been accumulated all along the path from the destination, i.e., that the AIGP attribute does not appear when there are "gaps" along the path where the IGP metric is unknown.

§ 1.2.2.1 Parts of the AIGP Attribute

RFC 7311 specifies that the AIGP attribute is an optional, non-transitive BGP path attribute, and that the attribute type code for the AIGP attribute is 26. The value field of the AIGP attribute is defined in RFC 7311 as a set of elements encoded as "Type/Length/Value" (a set of "TLVs"). Each such TLV includes (1) a single octet encoding the TLV Type (e.g., type=1), (2) two octets encoding the length in octets of the TLV, including the Type and Length fields (e.g., length=11), and (3) a value field containing zero or more octets. The value field carries an Accumulated IGP Metric.

The value field of the AIGP TLV is always 8 octets long, and its value is interpreted as an unsigned 64-bit integer. IGP metrics are frequently expressed as 4-octet values. By using an 8-octet field, RFC 7311 ensures that the AIGP attribute can be used to hold the sum of an arbitrary number of 4-octet values.

When an AIGP attribute is created, it should contain no more than one AIGP TLV. If, however, it contains more than one AIGP TLV, only the first one is used. In the following, the term "value of the AIGP TLV" means the value of the first AIGP TLV in the AIGP attribute. Any other AIGP TLVs in the AIGP attribute must be passed along unchanged if the AIGP attribute is passed along.

§ 1.2.2.2 Handling, Creating and Modifying the AIGP Attribute

RFC 7311 specifies that when receiving a BGP Update message containing a "malformed" AIGP attribute (as defined in RFC 7311), the attribute must be treated exactly as if it were an unrecognized non-transitive attribute, whereby it is ignored and not passed along to other BGP peers. This is equivalent to the "attribute discard" action specified in [BGP-ERROR].

An implementation that supports the AIGP attribute should support a per-session configuration item, "AIGP_SESSION," that indicates whether the attribute is enabled or disabled for use on that session. For IBGP sessions, and for EBPG sessions between members of the same BGP Confederation [BGP-CONFED], the default value of AIGP_SESSION SHOULD be "enabled". For all other EBGP sessions, the default value of AIGP_SESSION is "disabled". The AIGP attribute is not sent on any BGP session for which AIGP_SESSION is disabled. If, however, an AIGP attribute is received on a BGP session for which AIGP_SESSION is disabled, the AIGP attribute is treated as if it were an unrecognized non-transitive attribute. That is, it is quietly ignored and not passed along to other BGP peers.

§ 1.2.2.2.1 Originating the AIGP Attribute

An implementation that supports the AIGP attribute supports a configuration item, "AIGP_ORIGINATE," that enables or disables its creation and attachment to routes. The default value of AIGP_ORIGINATE is "disabled".

A BGP speaker must not add the AIGP attribute to any route whose path leads outside the AIGP administrative domain to which the BGP speaker belongs. This is because when the AIGP attribute is used, changes in IGP routing will directly impact BGP routing, and attaching the AIGP attribute to customer routes, Internet routes, or other routes whose paths lead outside the infrastructure of a particular AIGP administrative domain could result in BGP scaling and/or thrashing problems.

The AIGP attribute may be added only to routes that satisfy one of the following conditions:

(a) The route is a static route, not leading outside the AIGP administrative domain, that is being redistributed into BGP;
(b) The route is an IGP route that is being redistributed into BGP;
(c) The route is an IBGP-learned route whose AS_PATH attribute is empty; or
(d) The route is an EBGP-learned route whose AS_PATH contains only ASes that are in the same AIGP administrative domain as the BGP speaker.

A BGP speaker R must not add the AIGP attribute to any route for which R does not set itself as the next hop.

It should be possible to set AIGP_ORIGINATE to "enabled for the routes of a particular IGP ((e.g., open shortest path first ("OSPF"), Intermediate System-Intermediate System ("IS-IS"), etc.) that are redistributed into BGP.

When originating an AIGP attribute for a BGP route to address prefix P, the value of the AIGP TLV is set according to policy. There are a number of useful policies, some examples of which are now introduced. As a first example policy, when a BGP speaker R is redistributing into BGP an IGP route to address prefix P, the IGP will have computed a distance from R to P. This distance may be assigned as the value of the AIGP TLV. As a second example policy, a BGP speaker R may be redistributing into BGP a static route to address prefix P, for which a distance from R to P has been configured. This configured distance be assigned as the value of the AIGP TLV. As a third example policy, a BGP speaker R may have received and installed a BGP-learned route to prefix P, with next hop N. Or it may be redistributing a static route to P, with next hop N. In such cases, if R has an IGP route to N, the IGP-computed distance from R to N may be used as the value of the AIGP TLV of the route to P, while if R has a BGP route to N, and an AIGP TLV attribute value has been computed for that route, that AIGP TLV attribute value may be used as the AIGP TLV value of the route to P.

If BGP speaker R is the originator of the AIGP attribute of prefix P, and the distance from R to P changes at some point, R should issue a new BGP update containing the new value of the AIGP TLV of the AIGP attribute. (The term "distance" is used to refer to whatever value the originator assigns to the AIGP TLV, however it is computed.) However, if the difference between the new distance and the distance advertised in the AIGP TLV is less than a configurable threshold, the update may be suppressed.

Suppose a BGP speaker R1 receives a route with an AIGP attribute whose value is A and with a next hop whose value is R2. Suppose also that R1 is about to redistribute that route on a BGP session that is enabled for sending/receiving the attribute. If R1 does not change the next hop of the route, then R1 must not change the AIGP attribute value of the route.

In all the computations discussed in this section, the AIGP value is capped at its maximum unsigned value 0xffffffffffffffff. Increasing the AIGP value must not cause the value to wrap around.

Suppose R1 changes the next hop of the route from R2 to R1. If R1's route to R2 is either (a) an IGP-learned route or (b) a static route that does not require recursive next hop resolution, then R1 increases the value of the AIGP TLV by adding to A the distance from R1 to R2. This distance is either the IGP-computed distance from R1 to R2 or some value determined by policy. However, A is to be increased by a non-zero amount.

It is possible that R1 and R2 above are EBGP neighbors and that there is a direct link between them on which no IGP is running. Then, when R1 changes the next hop of a route from R2 to R1, the AIGP TLV value is increased by a non-zero amount. The amount of the increase should be such that it is properly comparable to the IGP metrics. For example, if the IGP metric is a function of latency, then the amount of the increase should be a function of the latency from R1 to R2.

Suppose R1 changes the next hop of the route from R2 to R1 and R1's route to R2 is either (a) a BGP-learned route or (b) a static route that requires recursive next-hop resolution. Then, the AIGP TLV value is increased in several steps, according to the following procedure.

1. Let Xattr be the new AIGP TLV value.
2. Initialize Xattr to A.
3. Set XNH to R2.
4. Find the route to XNH.
5. If the route to XNH does not require recursive next-hop resolution, get the distance D from R1 to XNH. (Note that this condition cannot be satisfied the first time through this procedure.) If D is above a configurable threshold, set the AIGP TLV value to Xattr+D. If D is below a configurable threshold, set the AIGP TLV value to Xattr. In either case, exit this procedure.
6. If the route to XNH is a BGP-learned route that does NOT have an AIGP attribute, then exit this procedure and do not pass on any AIGP attribute. If the route has an AIGP attribute without an AIGP TLV, then the AIGP attribute may be passed along unchanged.
7. If the route to XNH is a BGP-learned route that has an AIGP TLV value of Y, then set Xattr to Xattr+Y and set XNH to the next hop of this route. (The intention here is that Y is the AIGP TLV value of the route as it was received by R1, without having been modified by R1.)
8. Go to step 4.

As should be apparent from the foregoing, the AIGP TLV value of a given route depends on (a) the AIGP TLV values of all the next hops that are recursively resolved during this procedure, and (b) the IGP distance to any next hop that is not recursively resolved. Any change due to (a) in any of these values will trigger a new AIGP computation for that route. Whether a change due to (b) triggers a new AIGP computation depends upon whether the change in IGP distance exceeds a configurable threshold.

If the AIGP attribute is carried across several ASes, each with its own IGP domain, the foregoing procedures are unlikely to give a sensible result if the IGPs are different (e.g., some OSPF and some IS-IS) or if the meaning of the metrics is different in the different IGPs (e.g., if the metric represents bandwidth in some IGP domains but represents latency in others). These procedures also are unlikely to give a sensible result if the metric assigned to inter-AS BGP links (on which no IGP is running) or to static routes is not comparable to the IGP metrics.

§ 1.2.2.3 Using the AIGP Attribute by BGP for Route Selection

Support for the AIGP attribute involves several modifications to the tie-breaking procedures of the BGP "phase 2" decision described in [BGP], Section 9.1.2.2. These modifications are described in below.

In some cases, the BGP decision process may install a route without executing any tie-breaking procedures. This may happen, for example, if only one route to a given prefix has the highest degree of preference (as defined in [BGP], Section 9.1.1). In this case, the AIGP attribute is not considered.

In other cases, some routes may be eliminated before the tie-breaking procedures are invoked (such as, for example, routes with AS-PATH attributes indicating a loop or routes with unresolvable next hops. In these cases, the AIGP attributes of the eliminated routes are not considered.

Assuming that the BGP decision process invokes the tie-breaking procedures described here are to be executed before any of the tie-breaking procedures described in [BGP], Section 9.1.2.2 are executed.

If any routes have an AIGP attribute containing an AIGP TLV, all routes that do not have an AIGP attribute containing an AIGP TLV may be removed from consideration.

If router R is considering route T, where T has an AIGP attribute with an AIGP TLV, then R computes the value A, defined as follows: set A to the sum of (a) T's AIGP TLV value and (b) the IGP distance from R to T's next hop. Then, all routes that are not tied for the lowest value of A (e.g., shortest distance, lowest cost, etc.) are removed from consideration.

Suppose that a given router R1 is comparing two BGP-learned routes, such that either: (A) the two routes have equal AIGP TLV values; or else (B) neither of the two routes has an AIGP attribute containing an AIGP TLV. In such a case, the BGP decision process as specified in [BGP] makes use, in its tie-breaking procedures, of "interior cost", defined as follows. First, the interior cost of a route is determined by calculating the metric to the NEXT_HOP for the route using the Routing Table. RFC 7311 replaces the "interior cost" tie breaker of [BGP] with a tie breaker based on the "AIGP-enhanced interior cost". More specifically, suppose route T has a next hop of N. The "AIGP-enhanced interior cost" from node R1 to node N is defined as follows:

Let R2 be the BGP next hop of the route to N after all recursive resolution of the next hop is done. Let m be the IGP distance (or in the case of a static route, the configured distance) from R1 to R2.

If the installed route to N has an AIGP attribute with an AIGP TLV, set A to its AIGP TLV value, computed according to the procedure in § 1.2.2.2.1 above.

If the installed route to N does not have an AIGP attribute with an AIGP TLV, set A to 0.

The "AIGP-enhanced interior cost" of route T is the quantity A+m.

The "interior cost" tie breaker of [BGP] is then applied, using the "AIGP-enhanced interior cost" instead of the "interior cost" as defined in [BGP].

§ 1.2.2.4 Challenges when Using the AIGP Attribute

As should be appreciated from the foregoing, AIGP as defined in RFC 7311 tweaks the BGP path selection process so that (accumulated) IGP metrics may be considered in route selection.

Redundancy is often used in network design to achieve higher availability. Consequently, in such cases, routes can be learned via multiple border routers ("BRs") of via multiple domains. Unfortunately, however, if AIGP is implemented, an unstable domain and/or a 'flapping" link to a BR can lead to constant (or at least excessive) BGP updates to update the AIGP cost. This, in turn, can cause BGP nodes to calculate and recalculate new paths/routes excessively, which may (A) negatively impact memory and CPU resources of BGP routers, (B) cause sub-optimal routing, and/or (C) lead to packet drops and micro-loops in the network. Therefore, there is a need to avoid excessive updates when AIGP is implemented in such scenarios.

§ 2. SUMMARY OF THE INVENTION

The problem of excessive BGP updates to update the AIGP cost is systems with excessively changing IGP metrics is solved by (1) monitoring AIGP value changes over a given time period, (2) determining whether or not the AIGP value changes over the given period of time are excessive (e.g., are greater than a predetermined threshold), (3) responsive to a determination that the AIGP changes over the given period of time are not excessive, use the actual AIGP value in the AIGP protocol, but otherwise, responsive to a determination that the AIGP changes over the given period of time are excessive, (i) setting (e.g., locking) the AIGP value to a predetermined or derived value (and using the set or locked AIGP value in advertisements) for a second period of time (regardless of whether or not the actual AIGP value changes during the second period of time), and (ii) using the set (e.g., locked) AIGP value in the AIGP protocol.

In some example embodiments consistent with the present invention, the set or locked AIGP value is a predetermined value. In some other example embodiments consistent with the present invention, the set or locked value is calculated or otherwise derived (e.g., a maximum AIGP value, a minimum AIGP value, an average AIGP value, or some other linear, polynomial or exponential function of a past AIGP value, or past AIGP values.

§ 4. DETAILED DESCRIPTION

The present invention may involve novel methods, apparatus, message formats, and/or data structures for controlling AIGP attribute updates. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regards their invention as any patentable subject matter described.

§ 4.1 Definitions

"Adj-RIB-In" contains unprocessed routing information that has been advertised to a local BGP speaker by its peers.

"Adj-RIB-Out" contains the routes for advertisement to specific peers by means of the local speaker's UPDATE messages.

"Autonomous System ("AS")": The classic definition of an Autonomous System is a set of routers under a single technical administration, using an interior gateway protocol ("IGP") and common metrics to determine how to route packets within the AS, and using an inter-AS routing protocol to determine how to route packets to other ASes. Since this classic definition was developed, it has become common for a single AS to use several IGPs and, sometimes, several sets of metrics within an AS. The use of the term Autonomous System stresses the fact that, even when multiple IGPs and metrics are used, the administration of an AS appears to other ASes to have a single coherent interior routing plan, and presents a consistent picture of the destinations that are reachable through it.

"BGP Identifier": A 4-octet unsigned integer that indicates the BGP Identifier of the sender of BGP messages. A given BGP speaker sets the value of its BGP Identifier to an IP address assigned to that BGP speaker. The value of the BGP Identifier is determined upon startup and is the same for every local interface and BGP peer.

"BGP speaker": A router that implements BGP.

"External BGP (or "eBGP")": A BGP connection between external peers.

"External peer": A peer that is in a different Autonomous System ("AS") than the local system.

"Feasible route": An advertised route that is available for use by the recipient.

"Internal BGP (or iBGP")": A BGP connection between internal peers.

"Internal peer": A peer that is in the same Autonomous System as the local system.

"Interior Gateway Protocol (or "IGP")": A routing protocol used to exchange routing information among routers within a single Autonomous System (AS).

"Loc-RIB": A routing information based that contains the routes that have been selected by the local BGP speaker's Decision Process.

"NLRI": Network Layer Reachability Information.

"Route": A unit of information that pairs a set of destinations with the attributes of a path to those destinations. The set of destinations are systems whose IP addresses are contained in one IP address prefix carried in the Network Layer Reachability Information (NLRI) field of an UPDATE message. The path is the information reported in the path attributes field of the same UPDATE message.

"RIB": Routing Information Base.

"Unfeasible route": A previously advertised feasible route that is no longer available for use.

§ 4.2 Example Environment

Figure 1:
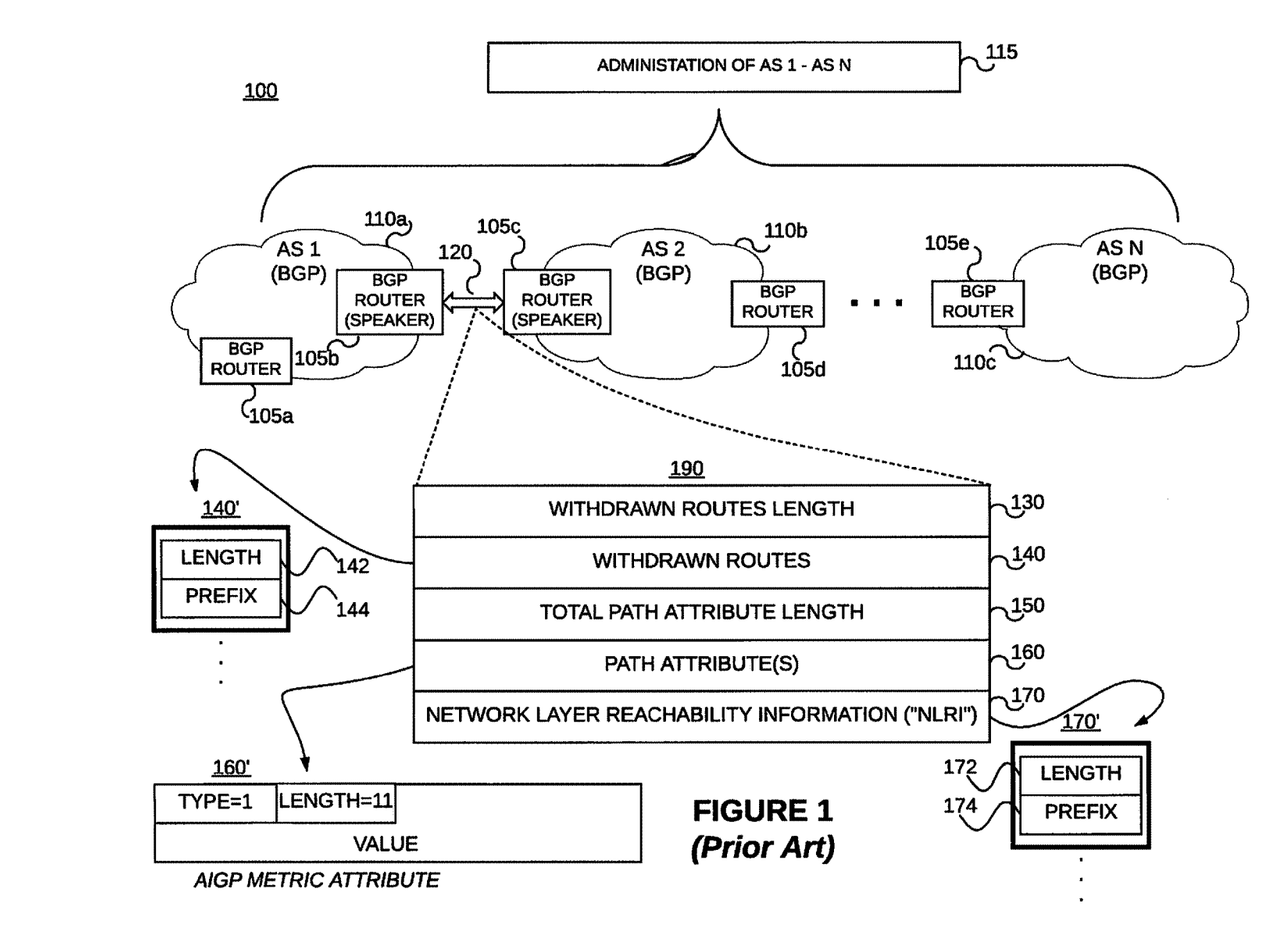
FIG. 1 illustrates an example environment in which the present invention may be used.

Recall, for example, from section § 1.2.2 above that there are deployments in which a single administrative entity (also referred to as a "single administration") runs a network that has been sub-divided into multiple, contiguous ASes, each running BGP. FIG. 1 illustrates an example environment 100 in which the present invention may be used, which includes a single administrative entity 115 associated with multiple autonomous systems (ASes 110a, 110b, . . . 110c). The ASes 110a-110c include BGP routers 105a-105e. BGP routers within an AS generally run IBGP, while BGP routers peering with a BGP router in another AS generally run EBGP. As shown, BGP router 105b and 105c are peers (also referred to as "BGP speakers") in a BGP session (depicted as 120) implementing AIGP. During the BGP session 120, the BGP speakers 105b and 105c may exchange BGP update messages. A BGP update message 190 carrying an AIGP attribute 160' is shown. Details of the BGP update message 190 are described in § 4.2.1 below.

§ 4.2.1 BGP "Update" Messages

In BGP, UPDATE messages are used to transfer routing information between BGP peers. The information in the UPDATE message can be used to construct a graph that describes the relationships of the various Autonomous Systems. More specifically, an UPDATE message is used to advertise feasible routes that share a common set of path attribute value(s) to a peer (or to withdraw multiple unfeasible routes from service). An UPDATE message MAY simultaneously advertise a feasible route and withdraw multiple unfeasible routes from service.

The UPDATE message 190 includes a fixed-size BGP header, and also includes the other fields, as shown in FIG. 1. (Note some of the shown fields may not be present in every UPDATE message). Referring to FIG. 1, the "Withdrawn Routes Length" field 130 is a 2-octets unsigned integer that indicates the total length of the Withdrawn Routes field 140 in octets. Its value allows the length of the Network Layer Reachability Information ("NLRI") field 170 to be determined, as specified below. A value of 0 indicates that no routes are being withdrawn from service, and that the WITHDRAWN ROUTES field 140 is not present in this UPDATE message 190.

The "Withdrawn Routes" field 140 is a variable-length field that contains a list of IP address prefixes for the routes that are being withdrawn from service. Each IP address prefix is encoded as a 2-tuple 140' of the form <length, prefix>. The "Length" field 142 indicates the length in bits of the IP address prefix. A length of zero indicates a prefix that matches all IP addresses (with prefix, itself, of zero octets). The "Prefix" field 144 contains an IP address prefix, followed by the minimum number of trailing bits needed to make the end of the field fall on an octet boundary. Note that the value of trailing bits is irrelevant.

Still referring to FIG. 1, the "Total Path Attribute Length" field 150 is a 2-octet unsigned integer that indicates the total length of the Path Attributes field 160 in octets. Its value allows the length of the Network Layer Reachability Information ("NLRI") field 170 to be determined. A value of 0 indicates that neither the Network Layer Reachability Information field 170 nor the Path Attribute field 160 is present in this UPDATE message.

The "Path Attributes" field 160 is a variable-length sequence of path attributes that is present in every UPDATE message, except for an UPDATE message that carries only the withdrawn routes. Each path attribute is a triple <attribute type, attribute length, attribute value> of variable length. The "Attribute Type" is a two-octet field that consists of the Attribute Flags octet, followed by the Attribute Type Code octet.

Finally, the "Network Layer Reachability Information" field 170 is a variable length field that contains a list of Internet Protocol ("IP") address prefixes. The length, in octets, of the Network Layer Reachability Information is not encoded explicitly, but can be calculated as: UPDATE message Length—23—Total Path Attributes Length (Recall field 150.)—Withdrawn Routes Length (Recall field 130.) where UPDATE message Length is the value encoded in the fixed-size BGP header, Total Path Attribute Length, and Withdrawn Routes Length are the values encoded in the variable part of the UPDATE message, and 23 is a combined length of the fixed-size BGP header, the Total Path Attribute Length field, and the Withdrawn Routes Length field.

Reachability information is encoded as one or more 2-tuples of the form <length, prefix> 170', whose fields are shown in FIG. 1 and described here. The "Length" field 172 indicates the length in bits of the IP address prefix. A length of zero indicates a prefix that matches all IP addresses (with prefix, itself, of zero octets). The "Prefix" field 174 contains an IP address prefix, followed by enough trailing bits to make the end of the field fall on an octet boundary. Note that the value of the trailing bits is irrelevant.

Referring back to "Path Attribute" field 160, as noted in § 1.2.2.1 above, RFC 7311 specifies that the AIGP attribute 160' is an optional, non-transitive BGP path attribute 160, and that the attribute type code for the AIGP attribute is 26. The value field of the AIGP attribute is defined in RFC 7311 as a set of elements encoded as "Type/Length/Value" (a set of "TLVs"). Each such TLV includes (1) a single octet encoding the TLV Type (e.g., type=1), (2) two octets encoding the length in octets of the TLV, including the Type and Length fields (e.g., length=11), and (3) a value field containing zero or more octets. The value field carries an Accumulated IGP Metric.

The value field of the AIGP TLV is always 8 octets long, and its value is interpreted as an unsigned 64-bit integer. IGP metrics are frequently expressed as 4-octet values. By using an 8-octet field, RFC 7311 ensures that the AIGP attribute can be used to hold the sum of an arbitrary number of 4-octet values.

The example methods described in § 4.2 below concern how AIGP values in BGP updates are handled.

§ 4.3 Example Methods

Figure 2:
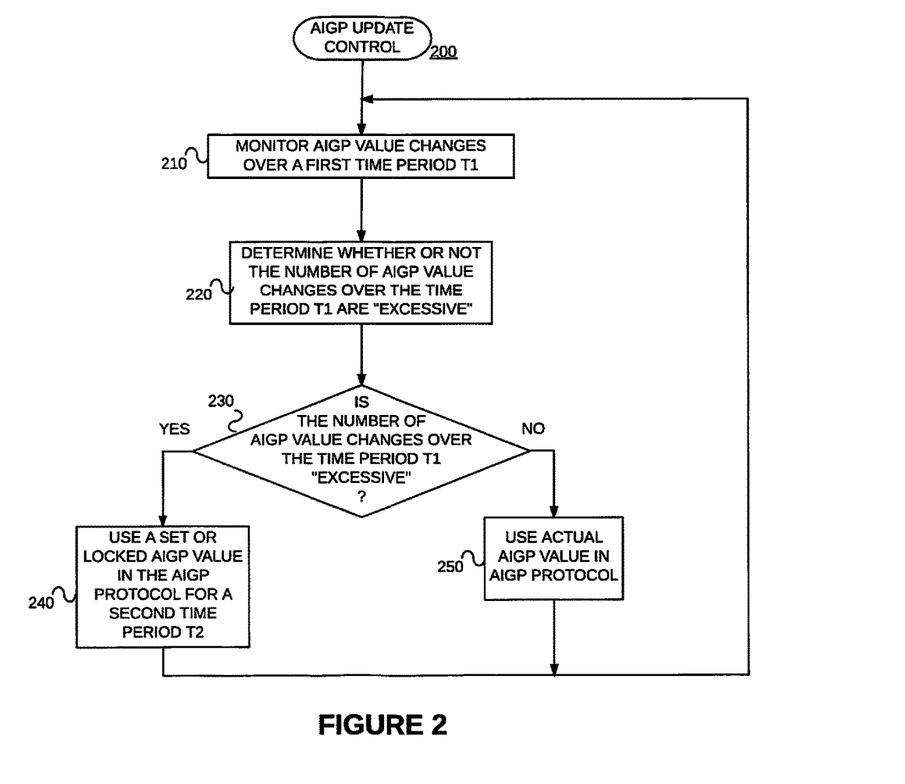
FIG. 2 is a flow diagram of a first example AIGP update control method consistent with the present invention.

FIG. 2 is a flow diagram of a first example AIGP update control method 200 consistent with the present invention. Changes in the AIGP value are monitored over a first time period T1. (Block 210) It is then determined whether or not the number of AIGP value changes over the time period T1 are "excessive" (e.g., based on comparing the number AIGP value changes with a predetermined value or determinable value). (Block 220) If it is determined that the number of AIGP value changes over the time period T1 is not "excessive" (Decision 230, NO), then the actual AIGP value (that is, the one carried in the AIGP metric attribute 160' of the latest BGP update 190) is used in the AIGP protocol. (Block 250) The method 200 is then repeated in successive time periods. If, on the other hand, it is determined that the number of AIGP value changes over the time period T1 is "excessive" (Decision 230, YES), then the AIGP value is set or "locked" at a predetermined or determinable value, and this set or locked AIGP value is used in the AIGP protocol for a second time period T2. (Block 240)

Note that the example method 200 will advantageously limit the potential problems caused by excessive AIGP value changes, such as those problems noted in § 1.2.2.4 above.

Figure 3:
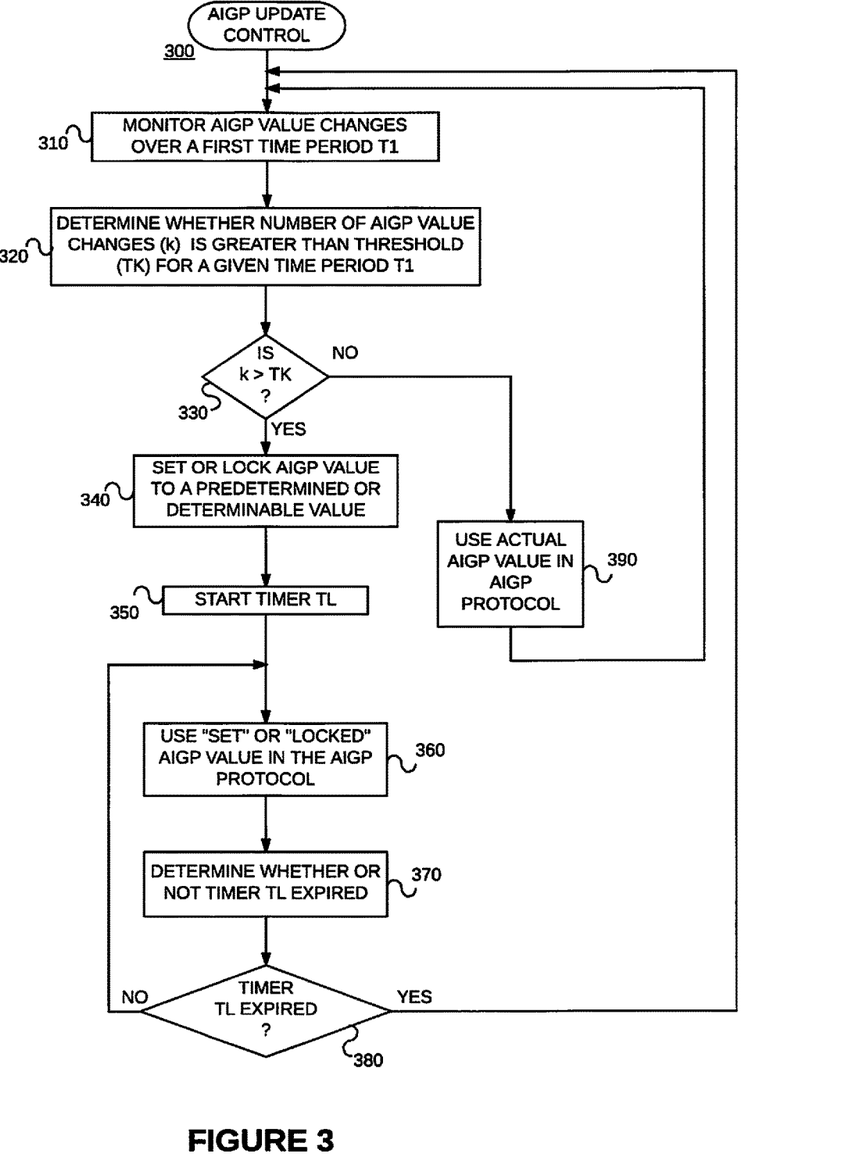
FIG. 3 is a flow diagram of a second example AIGP update control method consistent with the present invention.

FIG. 3 is a flow diagram of a second example AIGP update control method 300 consistent with the present invention. As shown, changes in the AIGP value are monitored over a first time period T1. (Block 310) It is then determined whether or not the number of AIGP value changes (k) over the time period T1 is greater than a (e.g., predetermined) threshold (TK). (Block 320) If the number of changes (k) in the AIGP value over first time period T1 is not greater than the threshold (TK) (Decision 330, NO), then the actual AIGP value is used in the AIGP protocol (Block 390), and the method 300 is repeated. If, on the other hand, the number of changes (k) in the AIGP value over first time period T1 is greater than the threshold (TK) (Decision 330, YES), then the AIGP value is set or "locked" at a predetermined or determinable value (Block 340), a timer (TL) is started (Block 350), the set or locked AIGP value is used in the AIGP protocol (Block 360), and it is determined whether or not the timer TL has expired (Block 370). If the timer TL has not expired (Decision 380, NO), then the example method 300 branches back to block 360. If, on other hand, the timer TL has expired (Decision 380, YES), then the method 300 is repeated.

Note that the example method 300 will advantageously limit the potential problems caused by excessive AIGP value changes, such as those problems noted in § 1.2.2.4 above. In some implementations of the example method 200 or 300, the set or locked AIGP value is a predetermined value. In some other example embodiments consistent with the present invention, the set or locked value is calculated or otherwise derived (e.g., a maximum AIGP value, a minimum AIGP value, an average AIGP value, or some other linear, polynomial function (e.g., a time weighted average) or exponential function (e.g., an exponentially decaying time weighted average) of a past AIGP value, or past AIGP values. The past AIGP value(s) used may be those values over a given time period, such as the most recent first time period T1.

§ 4.4 Example Apparatus

Figure 4:
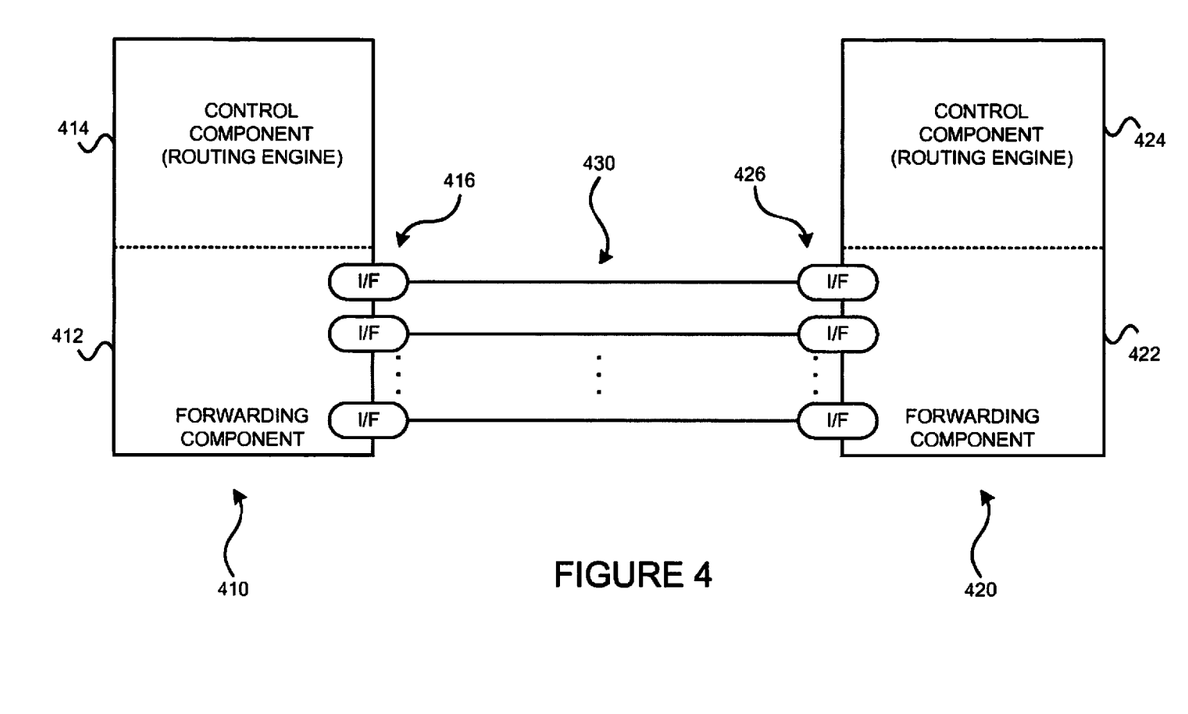
FIG. 4 illustrates an example environment including two systems coupled via communications links.

FIG. 4 illustrates two data forwarding systems 410 and 420 coupled via communications links 430. The links may be physical links or "wireless" links. The data forwarding systems 410,420 may be routers for example. If the data forwarding systems 410,420 are example routers, each may include a control component (e.g., a routing engine) 414,424 and a forwarding component 412,422. Each data forwarding system 410,420 includes one or more interfaces 416,426 that terminate one or more communications links 430.

As just discussed above, and referring to FIG. 5, some example routers 500 include a control component (e.g., routing engine) 510 and a packet forwarding component (e.g., a packet forwarding engine) 590.

Figure 5:
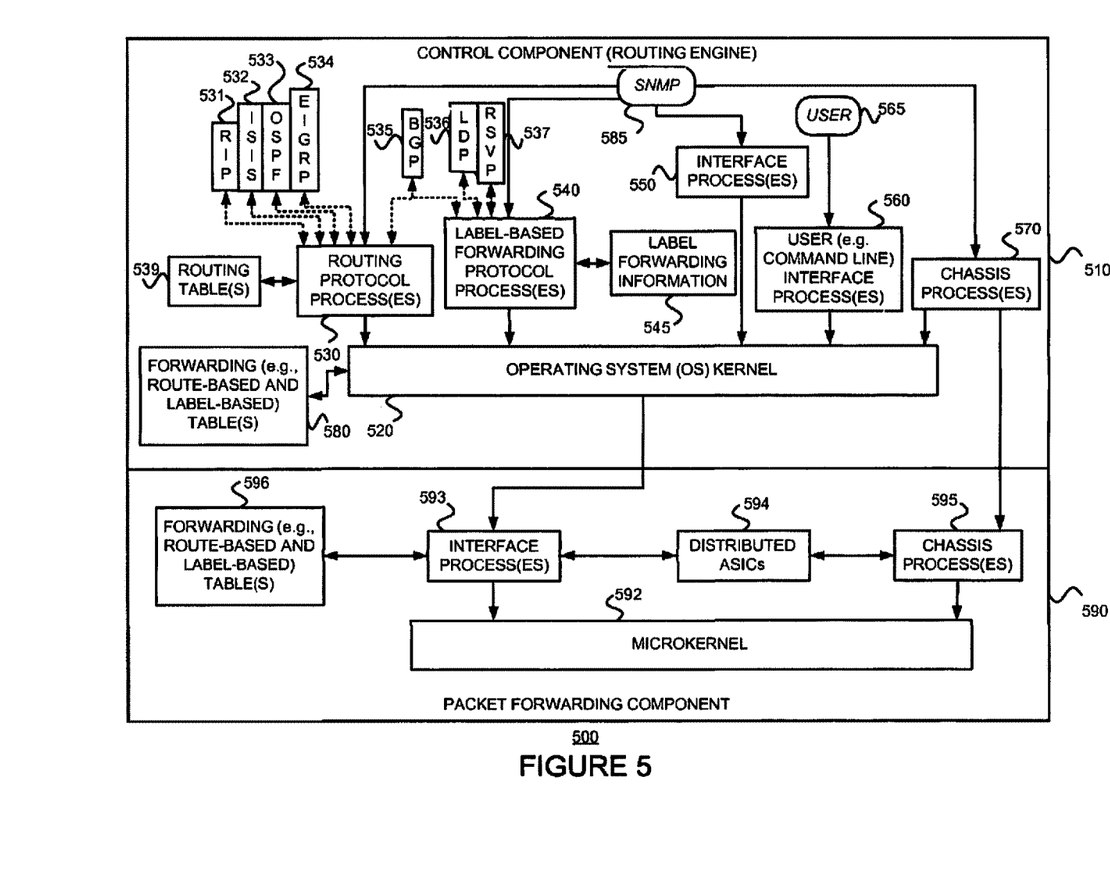
FIG. 5 is a block diagram of an example router on which the present invention may be implemented.

The control component 510 may include an operating system (OS) kernel 520, routing protocol process(es) 530, label-based forwarding protocol process(es) 540, interface process(es) 550, user interface (e.g., command line interface) process(es) 560, and chassis process(es) 570, and may store routing table(s) 539, label forwarding information 545, and forwarding (e.g., route-based and/or label-based) table(s) 580. As shown, the routing protocol process(es) 530 may support routing protocols such as the routing information protocol (RIP) 531, the intermediate system-to-intermediate system protocol (IS-IS) 532, the open shortest path first protocol (OSPF) 533, the enhanced interior gateway routing protocol (EIGRP) 534 and the boarder gateway protocol (BGP) 535, and the label-based forwarding protocol process(es) 540 may support protocols such as BGP 535, the label distribution protocol (LDP) 536 and the resource reservation protocol (RSVP) 537. One or more components (not shown) may permit a user 565 to interact with the user interface process(es) 560. Similarly, one or more components (not shown) may permit an external device to interact with one or more of the router protocol process(es) 530, the label-based forwarding protocol process(es) 540, the interface process(es) 550, and the chassis process(es) 570, via SNMP 585, and such processes may send information to an external device via SNMP 585.

The packet forwarding component 590 may include a microkernel 592, interface process(es) 593, distributed ASICs 594, chassis process(es) 595 and forwarding (e.g., route-based and/or label-based) table(s) 596.

In the example router 500 of FIG. 5, the control component 510 handles tasks such as performing routing protocols, performing label-based forwarding protocols, control packet processing, etc., which frees the packet forwarding component 590 to forward received packets quickly. That is, received control packets (e.g., routing protocol packets and/or label-based forwarding protocol packets) are not fully processed on the packet forwarding component 590 itself, but are passed to the control component 510, thereby reducing the amount of work that the packet forwarding component 590 has to do and freeing it to process packets to be forwarded efficiently. Thus, the control component 510 is primarily responsible for running routing protocols and/or label-based forwarding protocols, maintaining the routing tables and/or label forwarding information, sending forwarding table updates to the packet forwarding component 590, and performing system management. The example control component 510 may handle routing protocol packets, provide a management interface, provide configuration management, perform accounting, and provide alarms. The processes 530, 540, 550, 560 and 570 may be modular, and may interact with the OS kernel 520. That is, nearly all of the processes communicate directly with the OS kernel 520. Using modular software that cleanly separates processes from each other isolates problems of a given process so that such problems do not impact other processes that may be running. Additionally, using modular software facilitates easier scaling.

Still referring to FIG. 5, the example OS kernel 520 may incorporate an application programming interface (API) system for external program calls and scripting capabilities. The control component 510 may be based on an Intel PCI platform running the OS from flash memory, with an alternate copy stored on the router's hard disk. The OS kernel 520 is layered on the Intel PCI platform and establishes communication between the Intel PCI platform and processes of the control component 510. The OS kernel 520 also ensures that the forwarding tables 596 in use by the packet forwarding component 590 are in sync with those 580 in the control component 510. Thus, in addition to providing the underlying infrastructure to control component 510 software processes, the OS kernel 520 also provides a link between the control component 510 and the packet forwarding component 590.

Referring to the routing protocol process(es) 530 of FIG. 5, this process(es) 530 provides routing and routing control functions within the platform. In this example, the RIP 531, ISIS 532, OSPF 533 and EIGRP 534 (and BGP 535) protocols are provided. Naturally, other routing protocols may be provided in addition, or alternatively. Similarly, the label-based forwarding protocol process(es) 540 provides label forwarding and label control functions. In this example, the LDP 536 and RSVP 537 (and BGP 535) protocols are provided. Naturally, other label-based forwarding protocols (e.g., MPLS) may be provided in addition, or alternatively. In the example router 500, the routing table(s) 539 is produced by the routing protocol process(es) 530, while the label forwarding information 545 is produced by the label-based forwarding protocol process(es) 540.

Still referring to FIG. 5, the interface process(es) 550 performs configuration of the physical interfaces (Recall, e.g., 416 and 426 of FIG. 4.) and encapsulation.

The example control component 510 may provide several ways to manage the router. For example, it 510 may provide a user interface process(es) 560 which allows a system operator 565 to interact with the system through configuration, modifications, and monitoring. The SNMP 585 allows SNMP-capable systems to communicate with the router platform. This also allows the platform to provide necessary SNMP information to external agents. For example, the SNMP 585 may permit management of the system from a network management station running software, such as Hewlett-Packard's Network Node Manager (HP-NNM), through a framework, such as Hewlett-Packard's OpenView. Accounting of packets (generally referred to as traffic statistics) may be performed by the control component 510, thereby avoiding slowing traffic forwarding by the packet forwarding component 590.

Although not shown, the example router 500 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provides interaction with a command line interface (CLI) 560 via a console port, an auxiliary port, and/or a management Ethernet port The packet forwarding component 590 is responsible for properly outputting received packets as quickly as possible. If there is no entry in the forwarding table for a given destination or a given label and the packet forwarding component 590 cannot perform forwarding by itself, it 590 may send the packets bound for that unknown destination off to the control component 510 for processing. The example packet forwarding component 590 is designed to perform Layer 2 and Layer 3 switching, route lookups, and rapid packet forwarding.

As shown in FIG. 5, the example packet forwarding component 590 has an embedded microkernel 592, interface process(es) 593, distributed ASICs 594, and chassis process(es) 595, and stores a forwarding (e.g., route-based and/or label-based) table(s) 596. The microkernel 592 interacts with the interface process(es) 593 and the chassis process(es) 595 to monitor and control these functions. The interface process(es) 592 has direct communication with the OS kernel 520 of the control component 510. This communication includes forwarding exception packets and control packets to the control component 510, receiving packets to be forwarded, receiving forwarding table updates, providing information about the health of the packet forwarding component 590 to the control component 510, and permitting configuration of the interfaces from the user interface (e.g., CLI) process(es) 560 of the control component 510. The stored forwarding table(s) 596 is static until a new one is received from the control component 510. The interface process(es) 593 uses the forwarding table(s) 596 to look up next-hop information. The interface process(es) 593 also has direct communication with the distributed ASICs 594. Finally, the chassis process(es) 595 may communicate directly with the microkernel 592 and with the distributed ASICs 594.

In the example router 500, the example method 200 or 300 consistent with the present invention may be implemented in the BGP protocol 535.

Figure 6:
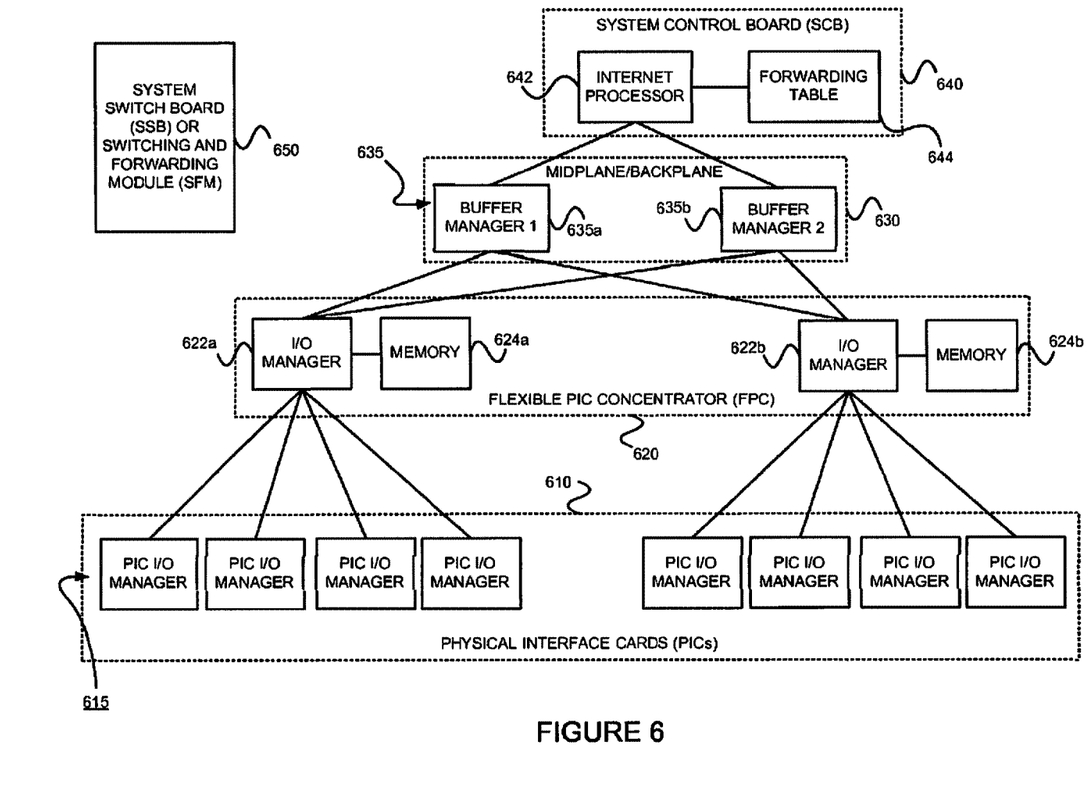
FIG. 6 is a block diagram of example distributed application specific integrated circuits ("ASICs") that may be provided in the example router of FIG. 5.

Referring back to distributed ASICs 594 of FIG. 5, FIG. 6 is an example of how the ASICS may be distributed in the packet forwarding component 590 to divide the responsibility of packet forwarding. As shown in FIG. 6, the ASICs of the packet forwarding component 590 may be distributed on physical interface cards (PICs) 610, flexible PIC concentrators (FPCs) 620, a midplane or backplane 630, and a system control board(s) 640 (for switching and/or forwarding). Switching fabric is also shown as a system switch board (SSB), or a switching and forwarding module (SFM) 650. Each of the PICs 610 includes one or more PIC I/O managers 615. Each of the FPCs 620 includes one or more I/O managers 622, each with an associated memory 624. The midplane/backplane 630 includes buffer managers 635*a*, 635*b*. Finally, the system control board 640 includes an internet processor 642 and an instance of the forwarding table 644 (Recall, e.g., 596 of FIG. 5).

Still referring to FIG. 6, the PICs 610 contain the interface ports. Each PIC 610 may be plugged into an FPC 620. Each individual PIC 610 may contain an ASIC that handles media-specific functions, such as framing or encapsulation. Some example PICs 610 provide SDH/SONET, ATM, Gigabit Ethernet, Fast Ethernet, and/or DS3/E3 interface ports.

An FPC 620 can contain from one or more PICs 610, and may carry the signals from the PICs 610 to the midplane/backplane 630 as shown in FIG. 6.

The midplane/backplane 630 holds the line cards. The line cards may connect into the midplane/backplane 630 when inserted into the example router's chassis from the front. The control component (e.g., routing engine) 510 may plug into the rear of the midplane/backplane 630 from the rear of the chassis. The midplane/backplane 630 may carry electrical (or optical) signals and power to each line card and to the control component 510.

The system control board 640 may perform forwarding lookup. It 640 may also communicate errors to the routing engine. Further, it 640 may also monitor the condition of the router based on information it receives from sensors. If an abnormal condition is detected, the system control board 640 may immediately notify the control component 510.

Figure 7A:
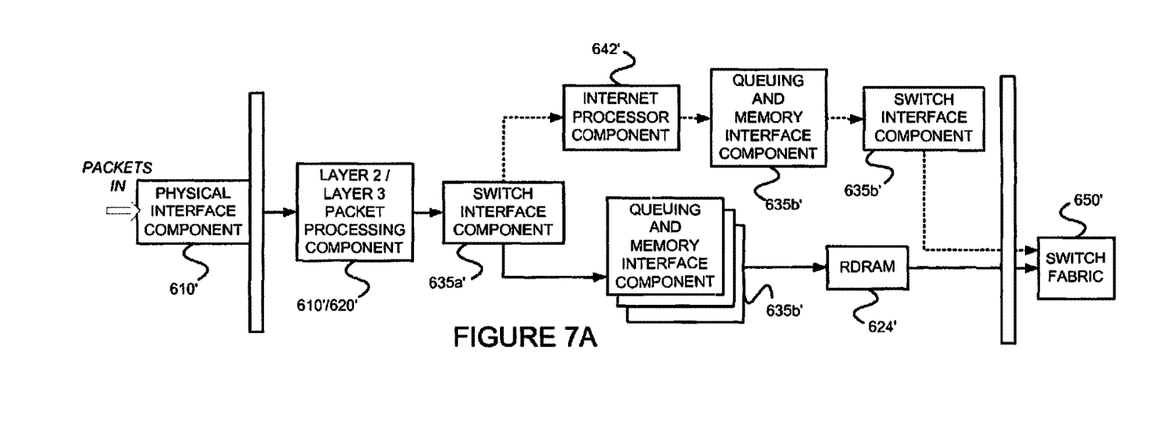
FIGS. 7A and 7B illustrate example packet forwarding operations of the example distributed ASICs of FIG. 6.
Figure 7B:
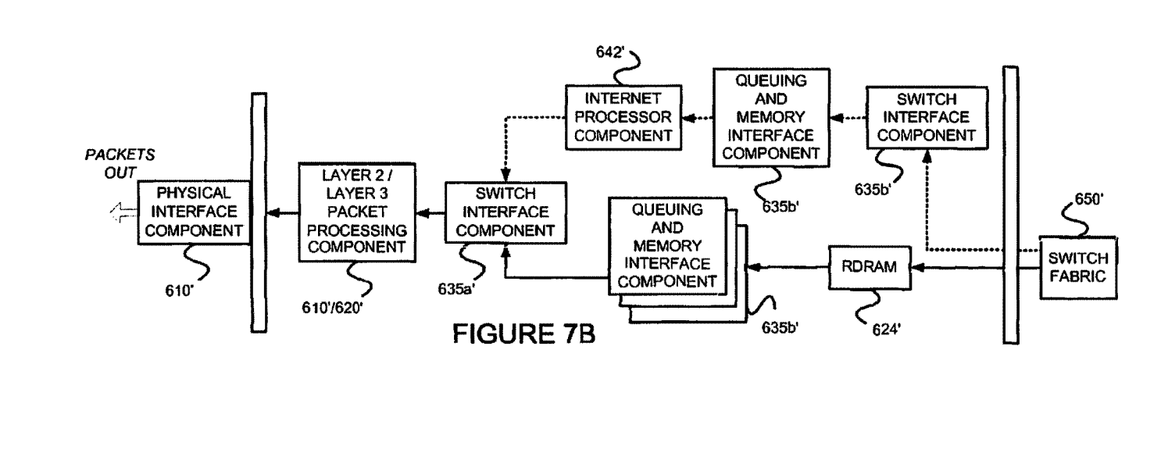

Referring to FIGS. 6, 7A and 7B, in some exemplary routers, each of the PICs 610,610' contains at least one I/O manager ASIC 615 responsible for media-specific tasks, such as encapsulation. The packets pass through these I/O ASICs on their way into and out of the router. The I/O manager ASIC 615 on the PIC 610,610' is responsible for managing the connection to the I/O manager ASIC 622 on the FPC 620,620', managing link-layer framing and creating the bit stream, performing cyclical redundancy checks (CRCs), and detecting link-layer errors and generating alarms, when appropriate. The FPC 620 includes another I/O manager ASIC 622. This ASIC 622 takes the packets from the PICs 610 and breaks them into (e.g., 64-byte) memory blocks. This FPC I/O manager ASIC 622 sends the blocks to a first distributed buffer manager (DBM) 635a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 635a' manages and writes packets to the shared memory 624 across all FPCs 620. In parallel, the first DBM ASIC 635a' also extracts information on the destination of the packet and passes this forwarding-related information to the Internet processor 642/642'. The Internet processor 642/642' performs the route lookup using the forwarding table 644 and sends the information over to a second DBM ASIC 635b'. The Internet processor ASIC 642/642' also collects exception packets (i.e., those without a forwarding table entry) and sends them to the control component 510. The second DBM ASIC 635b' then takes this information and the 64-byte blocks and forwards them to the I/O manager ASIC 622 of the egress FPC 620/620' (or multiple egress FPCs, in the case of multicast) for reassembly. (Thus, the DBM ASICs 635a' and 635b' are responsible for managing the packet memory 624 distributed across all FPCs 620/620', extracting forwarding-related information from packets, and instructing the FPC where to forward packets.)

The I/O manager ASIC 622 on the egress FPC 620/620' may perform some value-added services. In addition to incrementing time to live (TTL) values and re-encapsulating the packet for handling by the PIC 610, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 622 on the egress FPC 620/620' may be responsible for receiving the blocks from the second DBM ASIC 635b', incrementing TTL values, queuing a pointer to the packet, if necessary, before applying CoS rules, re-encapsulating the blocks, and sending the encapsulated packets to the PIC I/O manager ASIC 615.

Figure 8:
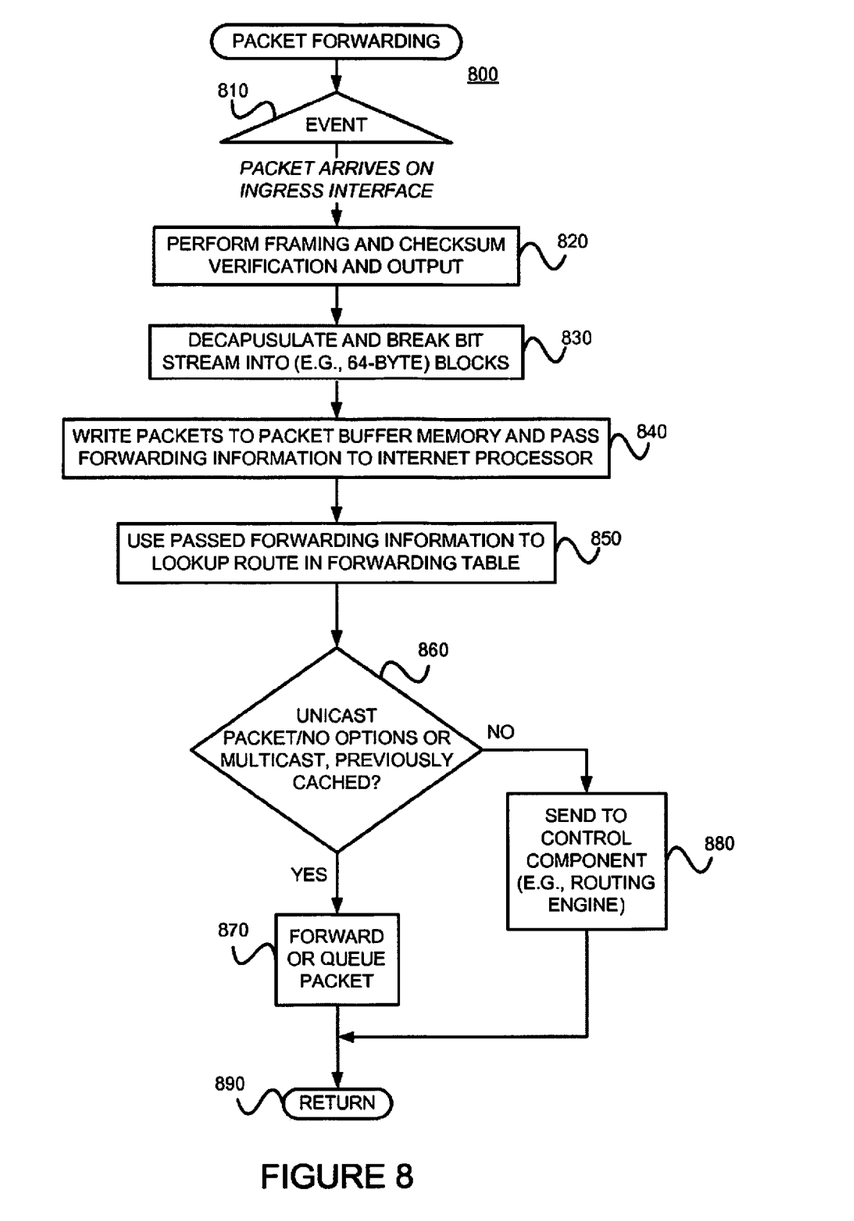
FIG. 8 is a flow diagram of an example packet forwarding method that may be implemented on any of the example routers of FIGS. 5 and 6.

FIG. 8 is a flow diagram of an example method 800 for providing packet forwarding in the example router. The main acts of the method 800 are triggered when a packet is received on an ingress (incoming) port or interface. (Event 810) The types of checksum and frame checks that are required by the type of medium it serves are performed and the packet is output, as a serial bit stream. (Block 820) The packet is then decapsulated and parsed into (e.g., 64-byte) blocks. (Block 830) The packets are written to buffer memory and the forwarding information is passed on the Internet processor. (Block 840) The passed forwarding information is then used to lookup a route in the forwarding table. (Block 850) Note that the forwarding table can typically handle unicast packets that do not have options (e.g., accounting) set, and multicast packets for which it already has a cached entry. Thus, if it is determined that these conditions are met (YES branch of Decision 860), the packet forwarding component finds the next hop and egress interface, and the packet is forwarded (or queued for forwarding) to the next hop via the egress interface (Block 870) before the method 800 is left (Node 890) Otherwise, if these conditions are not met (NO branch of Decision 860), the forwarding information is sent to the control component 510 for advanced forwarding resolution (Block 880) before the method 800 is left (Node 890).

Referring back to block 870, the packet may be queued. Actually, as stated earlier with reference to FIG. 6, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 622 may send a request for the packet to the second DBM ASIC 635b. The DBM ASIC 635 reads the blocks from shared memory and sends them to the I/O manager ASIC 622 on the FPC 620, which then serializes the bits and sends them to the media-specific ASIC of the egress interface. The I/O manager ASIC 615 on the egress PIC 610 may apply the physical-layer framing, perform the CRC, and send the bit stream out over the link.

Referring back to block 880 of FIG. 8, as well as FIG. 6, regarding the transfer of control and exception packets, the system control board 640 handles nearly all exception packets. For example, the system control board 640 may pass exception packets to the control component 510.

Although example embodiments consistent with the present invention may be implemented on the example routers of FIG. 4 or 5, embodiments consistent with the present invention may be implemented on communications network nodes (e.g., routers, switches, etc.) having different architectures. More generally, embodiments consistent with the present invention may be implemented on an example system 900 as illustrated on FIG. 9.

Figure 9:
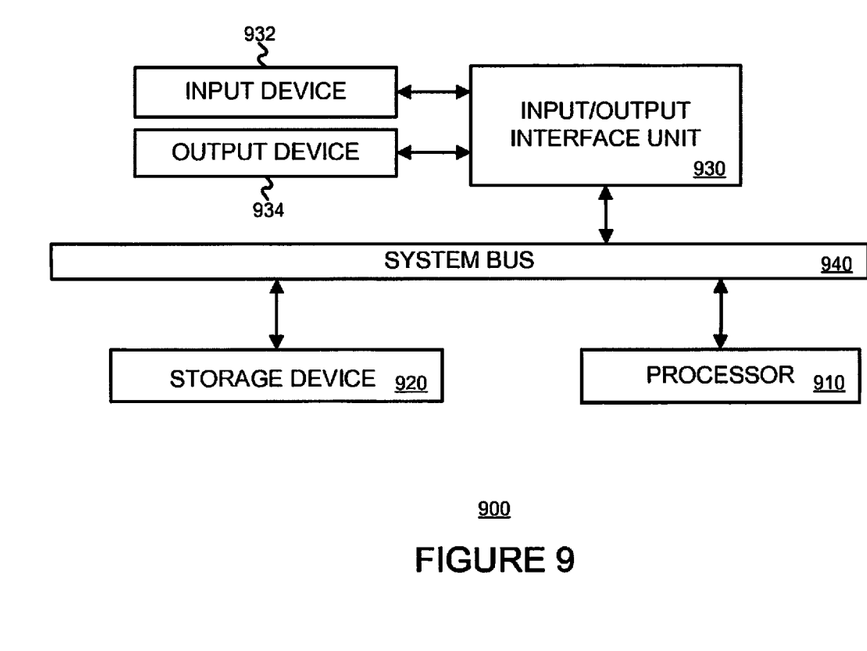
FIG. 9 is a block diagram of an example processor-based system that may be used to execute the example methods for controlling AIGP updates and/or to store information used and/or generated by such example methods.

FIG. 9 is a block diagram of an exemplary machine 900 that may perform one or more of the processes described, and/or store information used and/or generated by such processes. The exemplary machine 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930. The one or more processors 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 920 and/or may be received from an external source via one or more input interface units 930. The machine executable instructions may be stored as various software modules, each module performing one or more operations. Functional software modules are examples of components of the invention.

In some embodiments consistent with the present invention, the processors 910 may be one or more microprocessors and/or ASICs. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention might be implemented in hardware, such as one or more field programmable gate arrays ("FPGA"s), one or more integrated circuits such as ASICs, one or more network processors, etc. Alternatively, or in addition, embodiments consistent with the present invention might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.5 CONCLUSIONS

As should be appreciated from the foregoing, example embodiments and methods consistent with the present invention allow systems employing AIGP to avoid excessive updates which might otherwise occur, for example, when redundancy causes routes to be learned via multiple border routers ("BRs") of via multiple domains, which may in turn lead to an unstable domain and/or a 'flapping" link to a BR if AIGP is implemented. Therefore, example embodiments and methods consistent with the present invention prevent constant (or at least excessive) BGP updates to update the AIGP cost, and to prevent BGP nodes from calculating and recalculating new paths/routes excessively, which might otherwise (A) negatively impact memory and CPU resources of BGP routers, (B) cause sub-optimal routing, and/or (C) lead to packet drops and micro-loops in the network.

What is claimed is:

1. A computer-implemented method for controlling accumulated interior gateway protocol ("AIGP") updates, the computer implemented method comprising:
    a) monitoring AIGP value changes over a first time period;
    b) determining whether or not a monitored number of AIGP changes over the first time period is excessive based on a specified test;
    c) responsive to a determination that the monitored number of AIGP changes of the first time period is excessive, setting an AIGP value to a locked value and using the locked AIGP value in an AIGP protocol over a second time period and otherwise, responsive to a determination that the monitored number of AIGP changes over the first time period is not excessive, using actual AIGP values, as updated, in the AIGP protocol.

2. The computer-implemented method of claim 1 further comprising:
    d) determining whether or not the second time period has expired; and
    e) responsive to a determination that the second time has expired, using actual AIGP values, as updated, in the AIGP protocol.

3. The computer-implemented method of claim 1 wherein the specified test is whether or not the number of AIGP changes over the first time period exceeds a specified threshold.

4. The computer-implemented method of claim 1 wherein the locked AIGP value is a predetermined value.

5. The computer-implemented method of claim 1 wherein the locked AIGP value is derived from one or more past AIGP values.

6. The computer-implemented method of claim 5 wherein the locked AIGP value is one of (A) a minimum of past AIGP values, (B) a maximum of past AIGP values, (C) an average of past AIGP values, or (D) a time-weighted average of past AIGP values.

7. The computer-implemented method of claim 6 wherein the past AIGP values are those AIGP values from the most recent first time period.

8. The computer-implemented method of claim 1 wherein the AIGP value changes are carried in border gateway protocol (BGP) update messages.

9. The computer-implemented method of claim 8 wherein the BGP update messages are sent from a border router in a first autonomous system and received by another border router in a second autonomous system.

10. The computer-implemented method of claim 1 wherein the AIGP value changes are carried in as a path attribute in respective border gateway protocol (BGP) update messages.

11. Apparatus for controlling accumulated interior gateway protocol ("AIGP") updates, the apparatus comprising:
    a) a forwarding component for forwarding data in a communications network; and
    b) a control component including at least one processor configured to
        1) monitor AIGP value changes over a first time period,
        2) determine whether or not a monitored number of AIGP changes over the first time period is excessive based on a specified test, and 3) responsive to a determination that the monitored number of AIGP changes of the first time period is excessive, set an AIGP value to a locked value and using the locked AIGP value in an AIGP protocol over a second time period and otherwise, responsive to a determination that the monitored number of AIGP changes over the first time period is not excessive, use actual AIGP values, as updated, in the AIGP protocol.

12. The apparatus of claim 11 wherein the at least one processor is further configured to
4) determine whether or not the second time period has expired; and
5) responsive to a determination that the second time has expired, use actual AIGP values, as updated, in the AIGP protocol.

13. The apparatus of claim 11 wherein the specified test is whether or not the number of AIGP changes over the first time period exceeds a specified threshold.

14. The apparatus of claim 11 wherein the locked AIGP value is a predetermined value.

15. The apparatus of claim 11 wherein the locked AIGP value is derived from one or more past AIGP values, and wherein the locked AIGP value is one of (A) a minimum of past AIGP values, (B) a maximum of past AIGP values, (C) an average of past AIGP values, or (D) a time-weighted average of past AIGP values.

16. A non-transitory computer-readable medium storing processor executable instructions which, when executed by at least one processor, cause the at least one processor to perform a method for controlling accumulated interior gateway protocol ("AIGP") updates, the method comprising:
a) monitoring AIGP value changes over a first time period;
b) determining whether or not a monitored number of AIGP changes over the first time period is excessive based on a specified test;
c) responsive to a determination that the monitored number of AIGP changes of the first time period is excessive, setting an AIGP value to a locked value and using the locked AIGP value in an AIGP protocol over a second time period and otherwise, responsive to a determination that the monitored number of AIGP changes over the first time period is not excessive, using actual AIGP values, as updated, in the AIGP protocol.

17. The non-transitory computer-readable medium of claim 16 wherein the method further comprises:
d) determining whether or not the second time period has expired; and
e) responsive to a determination that the second time has expired, using actual AIGP values, as updated, in the AIGP protocol.

18. The non-transitory computer-readable medium of claim 16 wherein the specified test is whether or not the number of AIGP changes over the first time period exceeds a specified threshold.

19. The non-transitory computer-readable medium of claim 16 wherein the locked AIGP value is a predetermined value.

20. The non-transitory computer-readable medium of claim 16 wherein the locked AIGP value is derived from one or more past AIGP values, and wherein the locked AIGP value is one of (A) a minimum of past AIGP values, (B) a maximum of past AIGP values, (C) an average of past AIGP values, or (D) a time-weighted average of past AIGP values.

* * * * *